UNITED STATES PATENT OFFICE.

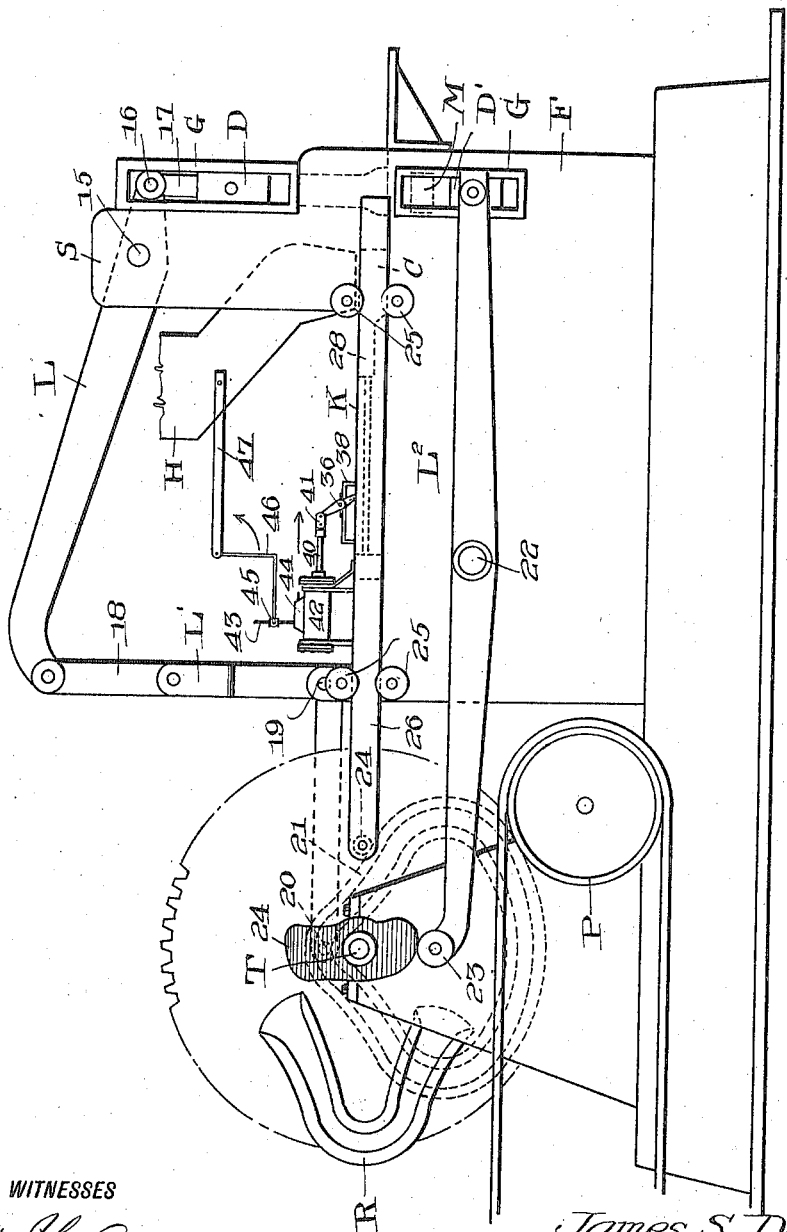

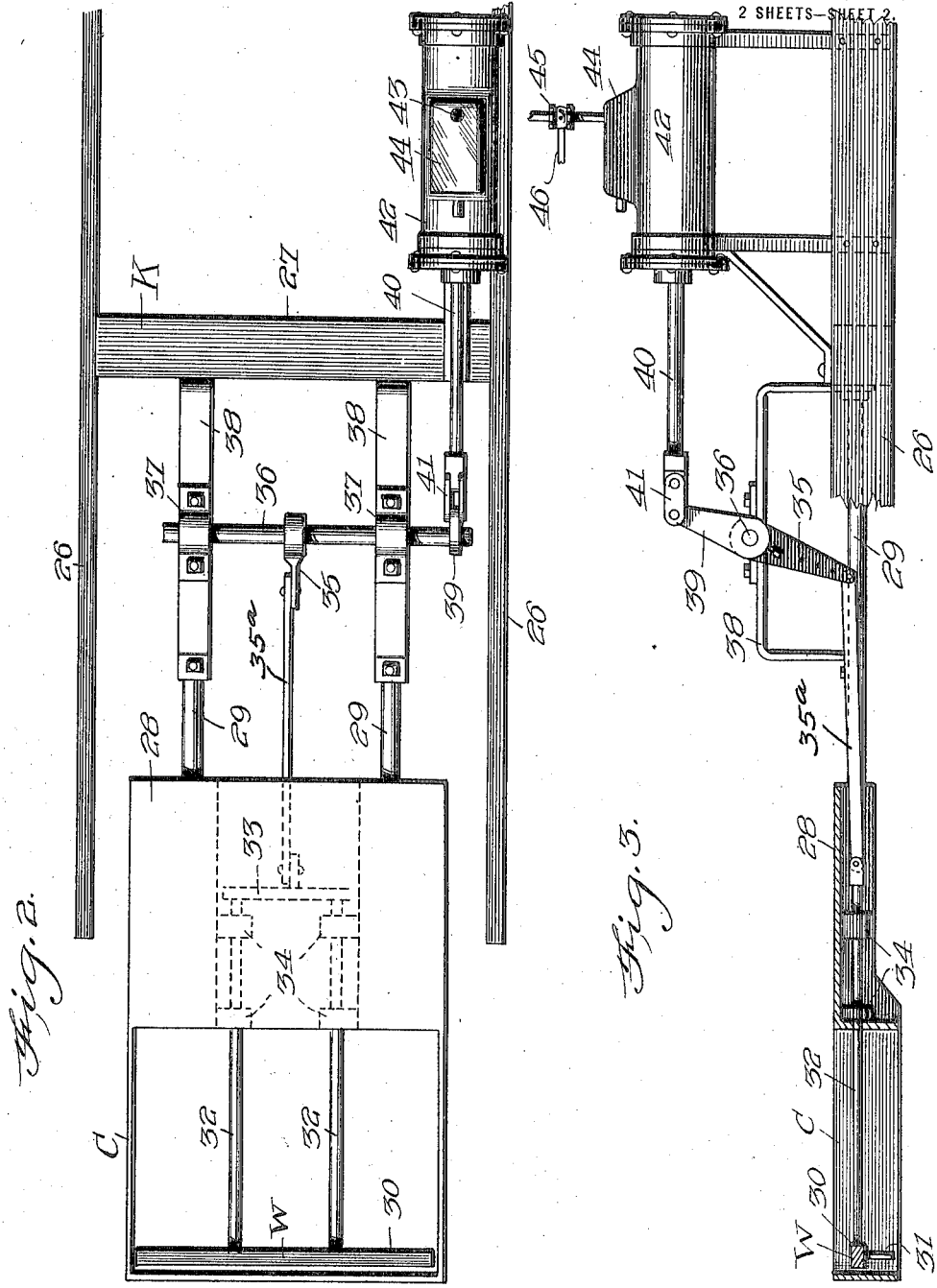

JAMES S. DOWNARD, OF ARDMORE, OKLAHOMA.

BLOCK-MOLDING MACHINE.

1,393,270.  Specification of Letters Patent.  Patented Oct. 11, 1921.

Application filed December 1, 1920. Serial No. 427,605.

*To all whom it may concern:*

Be it known that I, JAMES SHELBY DOWNARD, a citizen of the United States, and a resident of Ardmore, in the county of Carter and State of Oklahoma, have invented certain new and useful Improvements in Block-Molding Machines, of which the following is a specification.

My invention relates to block molding machines and particularly to a machine for molding blocks or bricks from viscous materials such as asphalt or mixtures thereof of the type wherein dies both above and below the molds operate to compress material introduced into the mold by moving chargers. In all machines of this character with which I am familiar, actual filling of the mold is effected by permitting the material to drop by gravity from the charger into the mold. Such a method is extremely impractical especially with viscous material, as a major portion of the material, because of its viscosity, invariably adheres to the walls of the charger so as to prevent its gravitation into the mold, while that part of the material which does manage to drop into the mold is in such a state of adhesion that it becomes lumpy and is thus unevenly distributed within the mold. In block making machines including dies which move only within certain fixed limits, a more uniform distribution of the material is necessary than is in the case of a hydraulic-ram operated die which continues to travel and compress until it has reached a certain prescribed pressure.

My invention has for its purpose the provision of a block molding machine which effects the disintegration or granulation of the material within the charger during the period in which the charger overlies the mold, thus reducing it to a uniform state so that it will gravitate into and completely and evenly fill the mold.

I will describe one form of block molding machine embodying my invention and will then point out the novel features thereof in claims.

In the accompanying drawings:

Figure 1 is a view showing in side elevation and partly diagrammatically one form of machine embodying my invention.

Fig. 2 is a top plan view of the charger, disintegrator and the mechanism for actuating the latter.

Fig. 3 is a view showing in side elevation and partly in section the elements shown in Fig. 2.

Similar reference characters refer to similar parts in each of the several views.

Referring specifically to the drawings and particularly to Fig. 1, F designates generally the frame or body of the machine within the forward end of which is suitably arranged a mold M. Above and below the mold M are dies D and D' which are movable vertically in guideways G and G', respectively. The die D is operable by means of a lever L fulcrumed upon standards S at a point indicated at 15. The lever L is pivotally connected at its forward end as at 16 to an arm 17 connected to the die D, while its rear end is connected to a bell crank lever L' through the medium of a link 18. The bell crank lever is fulcrumed as at 19 with one end thereof provided with a pin 20 which is adapted to work within a cam slot 21 shown in dash lines in Fig. 1. The cam slot 21 is formed in a plate which is fixed to a shaft T driven by a pulley P which is operatively connected to the shaft through the gearing shown. The die D' is operated by a lever $L^2$ fulcrumed at the point indicated at 22. The rear end of the lever $L^2$ is provided with a roller 23 which contacts with the surface of a cam 24 fixed to the shaft T.

C designates the charger which is movable longitudinally of the frame to convey the material from a hopper H to a point above the mold M and between the dies D and D'. The charger C is carried by a carriage designated at K and operable by a cam R rotatable with the shaft T and formed with a substantially U-shaped slot that is adapted to engage a roller 24 carried by the rear end of the carriage. The carriage is mounted for longitudinal movement on rollers 25, and in the present instance comprises beams or bars 26 connected by a cross beam 27, as clearly shown in Fig. 2.

Referring now to Figs. 2 and 3, the charger C is here shown as consisting of a frame of rectangular outline having a rearwardly extending lip 28 which constitutes a shutter or valve for preventing the discharge of material from the hopper H when the charger is moving to and from the hopper. The charger and the shutter are rigidly connected to the carriage K by means of a pair of rods 29 so that when the carriage is moved longitudinally a corresponding movement is imparted to the charger and shutter.

For effecting a disintegration or granulation of the material within the charger C, I provide in the present instance a rake designated at W which comprises a bar 30 of a length to permit of its unrestricted movement longitudinally within the charger, and a plurality of depending teeth or tongs 31 secured to the bar 30 at regular spaced intervals throughout the length of such bar. The rake W is supported for movement within the charger by means of a pair of rods 32 which, as shown in Fig. 3, are journaled in bearings 34 fixed to the under side of the shutter 28. The rods 32 are connected at their rear ends by a cross bar 33 as clearly shown in Fig. 2, and operatively connected to the latter through the medium of a link 35ª is an arm 35 fixed to a shaft 36 journaled in bearings 37 carried by yokes 38 fixed to the rods 29. Keyed to one end of the shaft 36 is an arm 39 which latter in turn is operatively connected to a piston 40 through the medium of a link 41. The piston 40 is movable within a cylinder 42 to which compressed air is intermittently supplied to effect a reciprocation of the piston within the cylinder from a pipe 43 controlled by a double-acting valve (not shown) mounted within a valve casing 44. The passage of the compressed air from the pipe 43 into the valve casing 44 is controlled by means of a valve 45 which is automatically operable by any conventional means. As shown in Fig. 1, this means in the present instance comprises a bell crank lever 46 operatively connected to the valve and to an arm 47 pivotally supported upon the hopper H. The arrangement of the bell crank lever 46 and the arm 47 is such as to effect an opening of the valve 45 when the carriage K has been moved to its forward extreme position and to effect a closing of the valve when the carriage is in its rear extreme position as shown in Fig. 1.

As the mechanism described for actuating the dies D and D' and the carriage K is of common use in the art, a detailed description of its operation is unnecessary, it being suffice to say, that the mechanisms operate in such a manner as to move the charger C forwardly from beneath the discharge end of the hopper H to a point directly above the mold M. The charger C is maintained in that position for a predetermined period during which the material is deposited into the mold M. The charger then returns to its position below the mouth of the hopper H whereupon the dies D and D' move toward and into the mold M to effect a depression of the material therein.

As the charger C is moved from beneath the hopper H, the shutter 28 moves into spanning relation to the discharge end of the hopper, and because of its length maintains that spanning relation until the charger returns to its normal position, thus preventing discharge of the material from the hopper while the charger is adjustable from beneath the hopper.

With the movement of the carriage K to its forward extreme position an advance of the rake W together with its operating mechanism is likewise effected, and during such movement the bell crank lever 46 is actuated to move the valve 45 to open position so that during the period in which the charger C overlies the mold M, a reciprocation of the rake is effected. During this movement of the rake, the tongs 31 are moved longitudinally within the charger thus causing disintegration of the material therein so as to permit of the gravitation of all of the material into the mold M. As the charger C returns to its rear extreme position, the bell crank lever 46 again functions and moves the valves 45 to closed position thereby discontinuing the reciprocating movement of the rake to permit of the refilling of the charger.

Upon continued operation of the machine, the several elements continue to be operated in the sequence just described, it being understood that the charger C intermittently moves from the hopper to the mold and vice versa while the rake rapidly reciprocates each time the charger is directly above the mold, thus securing the complete and uniform discharge of the material into the mold to produce blocks of uniform consistency.

Although I have herein shown and described only one form of block molding machine, it is to be understood that other forms of disintegrators and mechanisms for actuating the same can be equally well employed without departing from the spirit of the invention and the spirit and scope of the appended claims.

What I claim is:

1. In a block molding machine, a mold, a hopper above and at one side of the mold, a charger movable between said hopper and mold, a shutter movable with said charger in a manner to prevent a discharge of material from said hopper when the charger is displaced from the discharge end of the hopper, a carriage mounted for reciprocating movement and operatively connected to said shutter and charger, a rake mounted for reciprocating movement within the charger, and means mounted on said carriage for actuating said rake.

2. In a block molding machine, a mold, a hopper above and at one side of the mold, a charger movable between said hopper and mold, a shutter movable with said charger in a manner to prevent a discharge of material from said hopper when the charger is displaced from the discharge end of the hopper, a carriage mounted for reciprocating movement and operatively connected to said shutter and charger, a rake mounted for reciprocating movement within the charger, a fluid motor mounted on the carriage and operatively connected to said rake, and mechanism operable by the movement of said carriage for controlling the supply of fluid to said motor.

3. In a block molding machine, a mold, a hopper above and at one side of the mold, a charger movable between said hopper and mold, a shutter movable with said charger in a manner to prevent a discharge of material from said hopper when the charger is displaced from the discharge end of the hopper, a carriage mounted for reciprocating movement and operatively connected to said shutter and charger, a rake mounted for reciprocating movement within the charger, a fluid motor mounted on the carriage and operatively connected to said rake, a valve for controlling the supply of fluid to said motor, and means operatively connected to said valve and supported upon said hopper for moving said valve to open or closed position according as said carriage is moved in one direction or the other whereby, a reciprocation of said rake is effected when the charger is directly above said mold.

4. In a block molding machine, a carriage, a charger supported on the carriage, a shutter at one end of the charger, a rake mounted for movement within the charger, and means mounted on the carriage for reciprocating said rake.

5. In a block molding machine, a carriage mounted for reciprocating movement, a charger of angular contour carried by said carriage, a shutter formed at one end of the charger, a rake in the charger, rods slidably supported in said charger and connected to said rake, a shaft operatively connected to said rods, means carried by the carriage for effecting an oscillation of said shaft whereby, said rake is reciprocated in the plane of the charger.

6. In a block molding machine, a carriage mounted for reciprocating movement, a charger rigidly supported on the carriage, a shutter formed integral with said charger, a rake within the charger, means for movably supporting the rake to permit of reciprocation thereof in the plane of the charger, and means mounted on the carriage for actuating said means.

JAMES S. DOWNARD.